(12) United States Patent
Arnot

(10) Patent No.: US 9,719,728 B2
(45) Date of Patent: Aug. 1, 2017

(54) TURBULATED IMMERSION HEAT-EXCHANGE APPARATUS

(71) Applicant: Roger Arnot, Abbotsford (CA)

(72) Inventor: Roger Arnot, Abbotsford (CA)

(*) Notice: Subject to any disclaimer, the term of this patent is extended or adjusted under 35 U.S.C. 154(b) by 0 days.

(21) Appl. No.: 13/910,934

(22) Filed: Jun. 5, 2013

(65) Prior Publication Data

US 2013/0264028 A1    Oct. 10, 2013

Related U.S. Application Data

(63) Continuation of application No. 13/585,619, filed on Aug. 14, 2012, now abandoned, and a continuation of application No. 12/089,125, filed as application No. PCT/CA2007/000927 on May 24, 2007, now abandoned.

(Continued)

(51) Int. Cl.

| | |
|---|---|
| *F28D 1/02* | (2006.01) |
| *F02M 31/16* | (2006.01) |
| *F02M 37/00* | (2006.01) |
| *F15B 21/04* | (2006.01) |
| *F28D 7/12* | (2006.01) |
| *F28F 1/24* | (2006.01) |
| *F28F 1/40* | (2006.01) |
| *F28F 9/02* | (2006.01) |
| *F28F 13/12* | (2006.01) |

(Continued)

(52) U.S. Cl.
CPC ............ *F28D 1/0213* (2013.01); *F02M 31/16* (2013.01); *F02M 37/0082* (2013.01); *F15B 21/042* (2013.01); *F28D 7/12* (2013.01); *F28F 1/24* (2013.01); *F28F 1/40* (2013.01); *F28F 9/00* (2013.01); *F28F 9/0246* (2013.01); *F28F 13/12* (2013.01); *F28F 2009/222* (2013.01); *F28F 2220/00* (2013.01); *Y02T 10/126* (2013.01)

(58) Field of Classification Search
CPC ........ F28F 9/0246; F28F 1/40; F28F 2220/00; F28D 1/0213
USPC .................................................... 165/74, 142
See application file for complete search history.

(56) References Cited

U.S. PATENT DOCUMENTS 1,835,323 A * 12/1931 Olson et al. ................... 165/103
2,376,373 A *  5/1945 Merckel ........................ 165/281
(Continued)

*Primary Examiner* — Devon Russell
(74) *Attorney, Agent, or Firm* — Palmer IP

(57) ABSTRACT

A submersible heat-exchanging apparatus for installation into storage tanks used for containing industrial oils. The apparatus comprises a cylindrical heat-exchange component with one end sealingly engaging a terminal plug and the other end sealingly engaging and communicating with a coupling manifold having opposed inflow and outflow ports. A flow-directing elongate insert is provided with one end configured to engage the coupling manifold interposed the inflow and outflow ports, and the other end provided with an aperture and configured for abutting the terminal plug. The flow-directing elongate insert slidingly contacts and cooperates with the inner walls of the heat-conductive conduit thereby partitioning the heat-conductive conduit into two opposed fluid transmission channels wherein one channel communicates with the inlet port and the other channel communicates with the outlet port. The coupling manifold sealingly engages an aperture provided in the storage tank whereby the heat-exchange component extends into the tank.

11 Claims, 8 Drawing Sheets

Related U.S. Application Data

(60) Provisional application No. 60/808,125, filed on May 25, 2006.

(51) Int. Cl.
  *F28F 9/00* (2006.01)
  *F28F 9/22* (2006.01)

(56) References Cited

U.S. PATENT DOCUMENTS

| | | | |
|---|---|---|---|
| 3,760,874 A * | 9/1973 | Boskovic | 165/177 |
| 3,937,276 A * | 2/1976 | Ostwald | 165/135 |
| 4,800,953 A * | 1/1989 | Veldhoff | 165/142 |
| 5,438,712 A * | 8/1995 | Hubenthal | 4/493 |
| 5,945,140 A * | 8/1999 | Lin | 425/552 |
| 6,244,196 B1 * | 6/2001 | Kimberlin | 110/317 |
| 6,276,922 B1 * | 8/2001 | Huston et al. | 425/547 |
| 7,159,837 B2 * | 1/2007 | Richards | 249/205 |
| 2005/0139344 A1 * | 6/2005 | Butler | 165/46 |

* cited by examiner

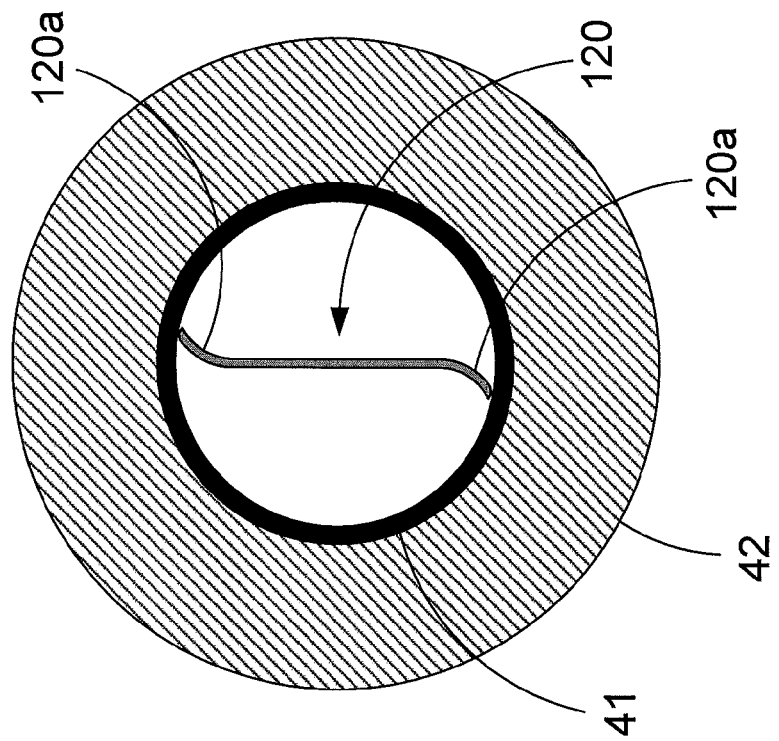
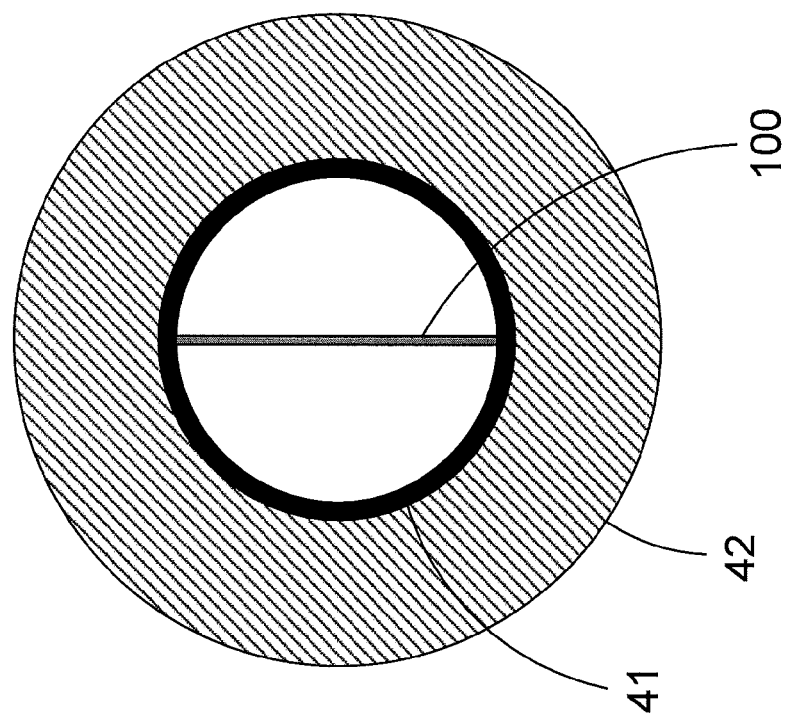

TURBULATED IMMERSION HEAT-EXCHANGE APPARATUS

CROSS-REFERENCE TO RELATED APPLICATIONS

This application is a continuation of application Ser. No. 13/585,619 filed on Aug. 14, 2012, which is a continuation of application Ser. No. 12/089,125 filed on Sep. 10, 2008, filed as application No. PCT/CA2007/000927 on May 24, 2007.

FIELD OF THE INVENTION

This invention relates to heat exchangers. More particularly, this invention relates to submersible heat exchangers configured for heating and/or cooling fluids contained in tanks.

BACKGROUND OF THE INVENTION

Heavy-duty transportation and construction equipment are typically powered by diesel-fuelled engines. Such equipment are commonly adapted with operator-controlled task-performing attachments that are precisely manipulated by hydraulic cylinders in cooperation with hydraulic oil pumps. The viscosities of diesel and hydraulic oils increase significantly as ambient temperatures decrease e.g., during extended cold periods and during winter months in temperate and in far northern and southern geographies. As ambient temperatures progressively drop below freezing (i.e., 0° C.), diesel and hydraulic oils continue to thicken to the point of forming gels and/or waxes. Cold weather conditions impede the transmission of thickened diesel fuel oils from their storage tanks to engines thereby interfering with and/or preventing engine starting. Smooth and safe operation of hydraulic-controlled attachments is adversely affected by cold-thickened hydraulic oil through reduced and impaired flow rates in response to manipulation of the hydraulic controls. Additionally, cold-thickened hydraulic oil imposes significant mechanical stresses on hydraulic pumps often resulting in accelerated wearing and deterioration of the pumps' components and periodically, in pump failure.

Large volumes of crude and refined petroleum products are commonly stored in large bulk reservoir tanks at locations such as drilling sites, refineries and storage depots. Transfer and transmission of such stored petroleum products are significantly debilitated as their viscosities increase as a consequence of cold weather conditions.

Numerous heat-exchange devices and apparatus as exemplified by U.S. Pat. Nos. 6,380,523; 5,423,373; 5,029,634; 4,926,830; 4,865,005; 4,726,346 and 4,237,850, have been developed for installation in portable and/or fixed storage tanks for raising or lowering the temperatures of oil products stored therein. However, numerous problems are associated with such prior art including complexity of design and associated high costs of production, variable and uneven heat-transfer profiles, and high energy input requirements for satisfactory performance.

SUMMARY OF THE INVENTION

The exemplary embodiments of the present invention are directed to a dead-head-type turbulated submersible heat-exchange apparatus. The apparatus comprises a cylindrical heat-exchanging component having two open ends, a coupling manifold configured to sealingly engage with one open end of the heat-exchanging component and to cooperate and communicate therewith with the heat-exchanging component, a plug device configured for sealingly engaging the other open end of the heat-exchanging component, and a flow-directing elongate insert configured to slidingly engage and communicate with the coupling manifold and the heat-exchanging component, and to abut the plug device.

According to one embodiment of the present invention, there is provided a coupling manifold having a collar portion that defines a first bore extending partially into the body of the coupling manifold. The body of the manifold is provided with a second bore therethrough intersecting the first bore in a transverse plane. The second bore defines an inlet port and an outlet port that communicate with the bore extending from the collar portion. It is preferred that the end wall of the first bore extending partially through the collar portion into the body of the manifold is provided with a slot interposed the inlet port and the outlet port.

According to one aspect, the collar portion is provided with an inward-facing female-threaded portion and an outward-facing male-threaded portion. In a suitable form, the outward-facing male-threaded portion is configured to threadably and sealably engage a threaded aperture provided therefore in a fluid storage receptacle. Exemplary fluid storage receptacles include tanks for storing therein crude and refined petroleum products such as oil, diesel fuel and the like.

According to another aspect, the inlet and outlet ports are provided with inward-facing female threads configured for sealably engaging hose barbs.

Alternatively, the inlet and outlet ports are configured to interconnect with and sealably engage fluid transmission lines.

According to yet another aspect, the body of the coupling manifold opposite the collar portion is provided with two opposing notches thereby defining an outwardly extending section having two parallel and opposed flat edges that are engagable by the jaws of wrenching tools.

According to another embodiment of the invention, there is provided a cylindrical heat-exchanging component comprising a heat-conducting conduit. In a suitable form, the conduit is provided with a plurality of uniformly spaced-apart heat-conductive fins radiating outward from the conduit. It is suitable for the fins to be integrally engaged with the outer surface of the conduit. It is also suitable that the plurality of fins extend to about one end of the conduit, i.e., the end that is sealably engagable with the plug device.

According to one aspect, the plug device is threadably sealably engaged with the conduit. by a compressive means. Alternatively, the plug device may be sealably engaged with the conduit by a compressive means, or optionally, by a process exemplified by brazing, welding and affixing with a polymeric adhesive It is preferred that a ferrule is interposed the plug device and the conduit prior to their assembly and sealing engagement.

According to another aspect of the invention, the end of the conduit opposite the plugged end is provided with an integral male-threaded collar configured for sealably engaging the female-threaded collar portion of the coupling manifold. In a suitable form, the conduit is provided with an integrally engaged lock nut wherefrom the male-threaded collar extends.

According to a further embodiment of the present invention, there is provided a helical turbulator insert for sliding communication with the heat-conducting conduit. The turbulator insert is configured with a tang at a first end and an aperture approximate the second opposite end. It is preferred that both ends are elongate. The tang end is configured to slidingly engage the slot provided in the end wall of the bore extending into the manifold body from the collar portion thereby fixing the turbulator insert in place and providing two separate fluid transmission channels within the heat-conducting conduit. An alternative, a flat rectilinear flow separator may be provided with a tang at a first end for engaging the slot in the manifold body and at least one aperture about the second end.

According to one aspect, the aperture provided at the second end comprises a U-shaped opening. However, the aperture may comprise at least one circular void approximate the second end and preferably, a plurality of closely spaced-together circular voids approximate the second end.

In an exemplary form, the dead-head turbulated submersible heat-exchange apparatus is demountably engaged with an oil storage tank by threadably coupling the outward-facing male-threaded portion of the manifold collar with a threaded receptacle provided therethrough the storage tank. The inlet and outlet ports are sealably interconnected with fluid transmission lines controllably communicating with a pressurized supply of temperature-manipulated and temperature-controlled heat-exchange fluid. Pressurized temperature-controlled heat-exchange fluid ingressing the apparatus through the coupling manifold inlet port, is redirected by the turbulator insert into and along the void formed by the inlet-facing side of the turbulator insert and the heat-exchanging conduit until the fluid reaches the plugged end of the heat-exchanging conduit where it is redirected through the aperture provided at the end of the turbulator insert. The pressurized fluid then flows back to the coupling manifold via the void between the outlet-facing side of the turbulator insert and the heat-exchanging conduit, and then egresses from the apparatus via the outlet port in the coupling manifold. The turbulated insert causes the pressurized heat-exchange fluid to flow in a spiral pattern toward and from the plugged end of the heat-exchanging component. The spiral flow pattern facilitates and enhances the ease-of-flow of the pressurized fluid through the aperture provided at the end of the turbulator insert and the re-direction of the flow pattern toward the coupling manifold end. The consequence is that a uniform temperature profile is provided radiating outward from the heat-exchanging apparatus into the stored oil products contained within the tank.

It is to be noted that the heat-exchanging component of the apparatus of the present invention is configured to extend into storage tanks for direct contact with fluid products stored therein while the coupling manifold of the apparatus protrudes from the external surface of the tanks and is easily accessible for installation and removal, for attachment to and disconnection from a pressurized supply of temperature-controlled heat-exchange fluid, and for inspections and service work as required. It is also to be noted that the present invention is useful for: (a) rapidly increasing the temperature and reducing the viscosities of cold-affected stored oils, and (b) rapidly decreasing the temperature and increasing the viscosities of heat-affected stored fluids. It is within the scope of the present invention to install pressure and temperature measuring and/or recording and/or reporting devices that communicate with the inlet port and/or the outlet port of the coupling manifold.

BRIEF DESCRIPTION OF THE DRAWINGS

The present invention will be described in conjunction with reference to the following drawings, in which:

FIG. 6($a$) is a cross-sectional end view of the exemplary embodiment shown in FIGS. 5, and 6($b$) is a cross-sectional end view showing an optional modification of the longitudinal edges of the rectilinear flow separator shown in FIG. 6($a$);

DETAILED DESCRIPTION OF THE INVENTION

Figure 1:
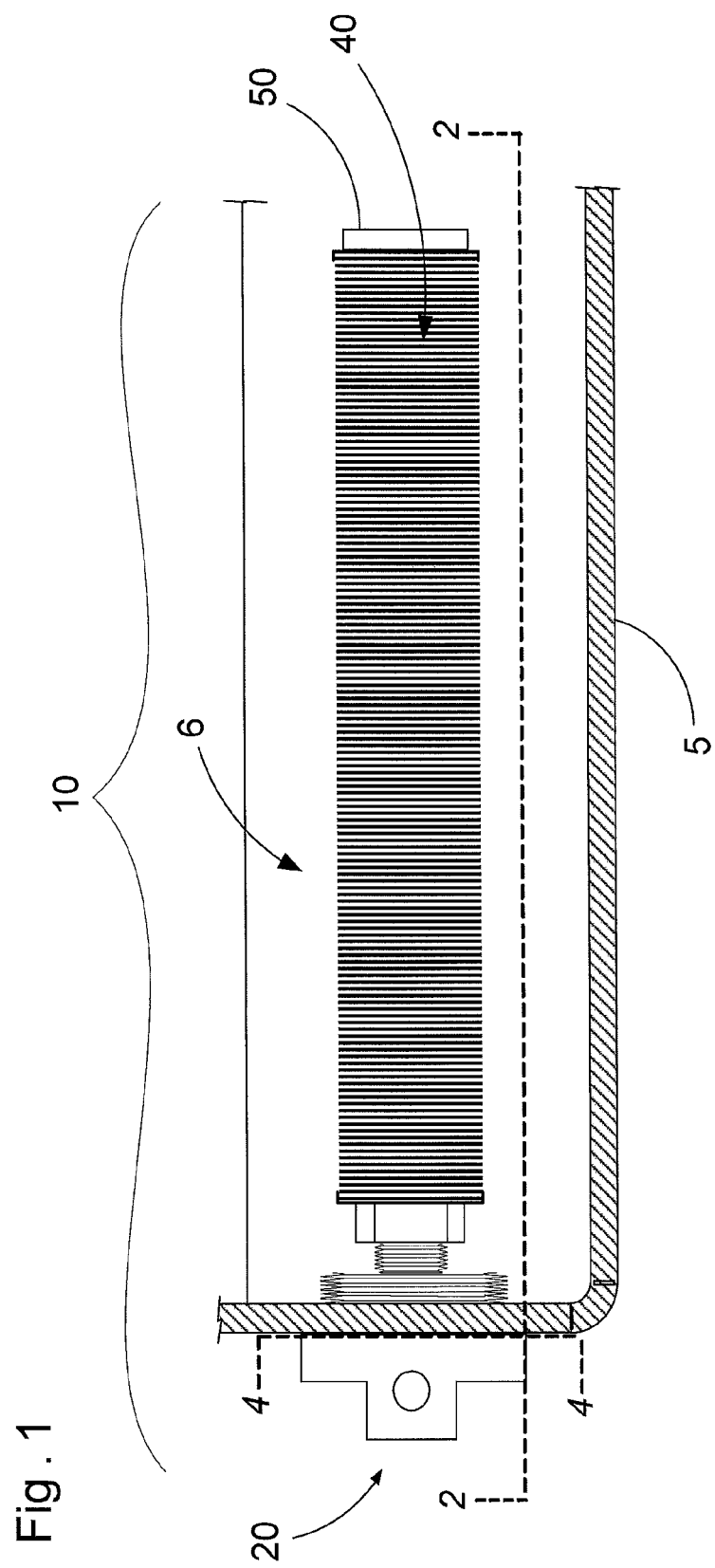
FIG. 1 is a side view of an exemplary embodiment of an assembled turbulated immersion heat exchange apparatus of the present invention installed into a fluids storage tank.

An exemplary embodiment of the turbulated submersible heat-exchange apparatus of the present invention is shown in the accompanying FIGS. 1-4, and is generally referred to by the numeral 10. The apparatus 10 comprises an elongate cylindrical heat-exchanging component 40 interconnected at one end with a coupling manifold 20 while the other end of component 40 is sealably engaged with a plug 50. A spiralled turbulator insert 30 extends through the heat-exchanging component 40 and abuts the manifold 20 and plug 50.

The coupling manifold 20 is provided with a collar 28 having an outward-facing male-threaded coupling portion 21 configured for threadably and sealably engaging a tank housing 5 storing a fluid 6 and an inner-facing female-threaded coupling portion 26 for sealably interconnecting with the heat-exchanging component 40. A bore 25 extends through the collar 28 into the body of the coupling manifold 20 and communicates with a threaded inlet/outet port 23 and a threaded inlet/outlet port 24. The inlet/outlet ports 23 and 24 are preferably configured to sealably engage conventional hose barbs and/or fluid transmission lines commonly known to those skilled in these arts. It is to be noted that, if so desired, ports 23 and 24 may be configured identically so that either port may serve as an inlet port and the opposing port may serve as the outlet port. A transverse slot 27 is provided at the end of the bore 25. The portion of the manifold 20 opposite the collar 28 is notched to provide two opposing flat surfaces 22 configured to cooperate with the jaws of a wrenching tool (not shown).

Figure 2:
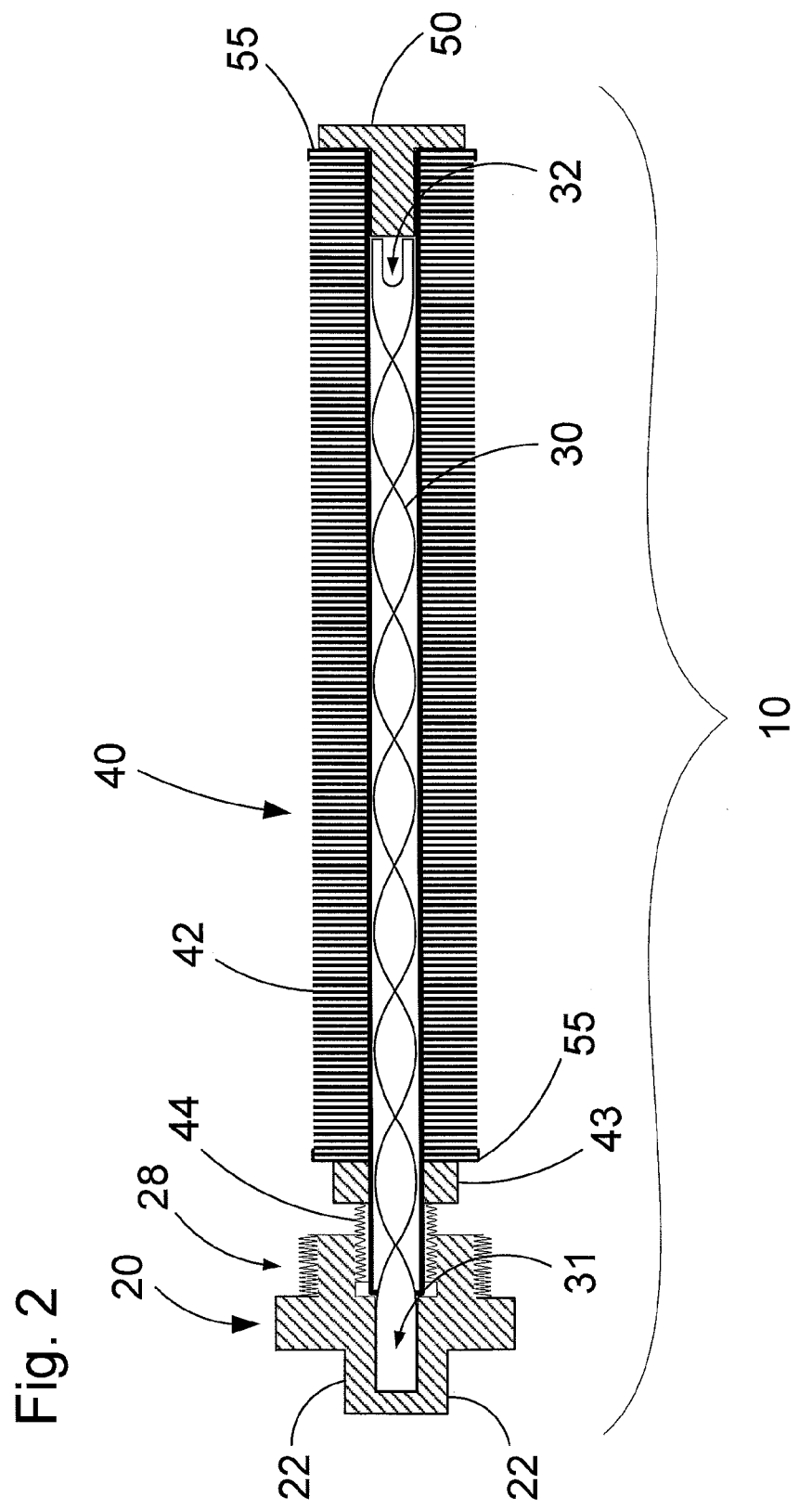
FIG. 2 is a cross-sectional side view of the embodiment shown in FIG. 1.
Figure 3:
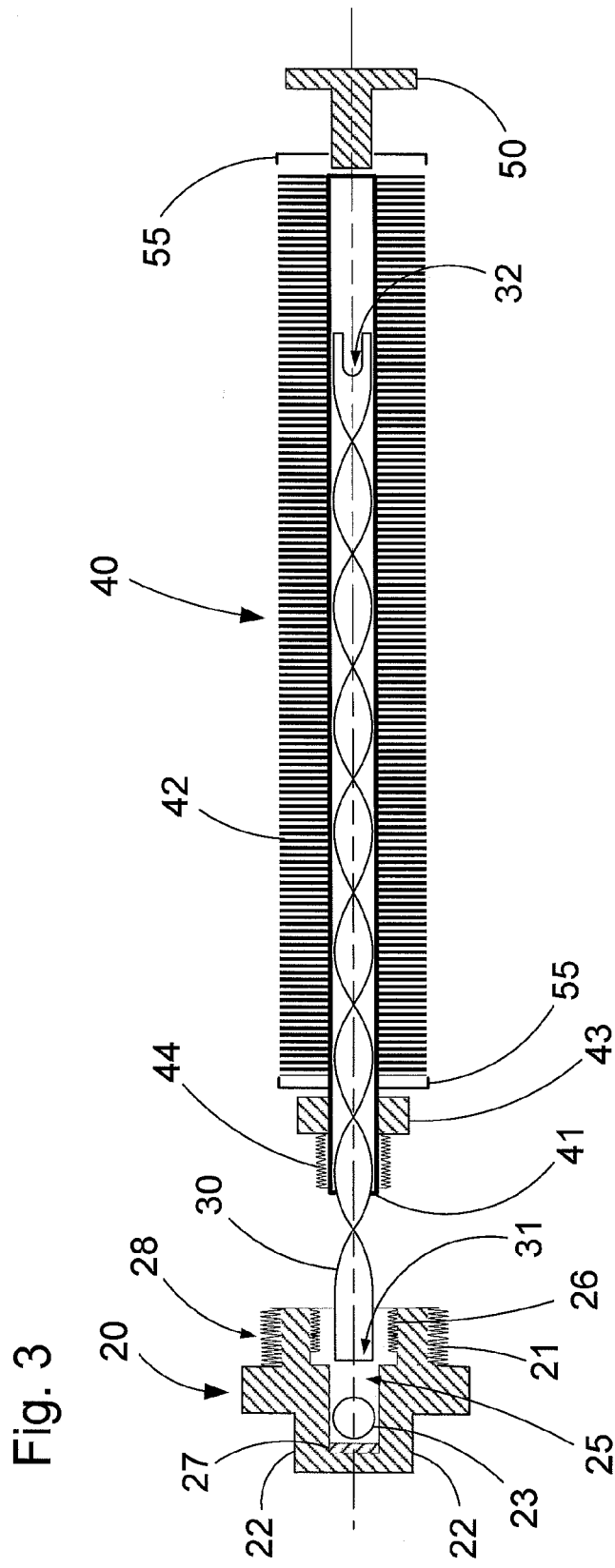
FIG. 3 is a partially exploded cross-sectional side view of the embodiment shown in FIG. 2.
Figure 4:
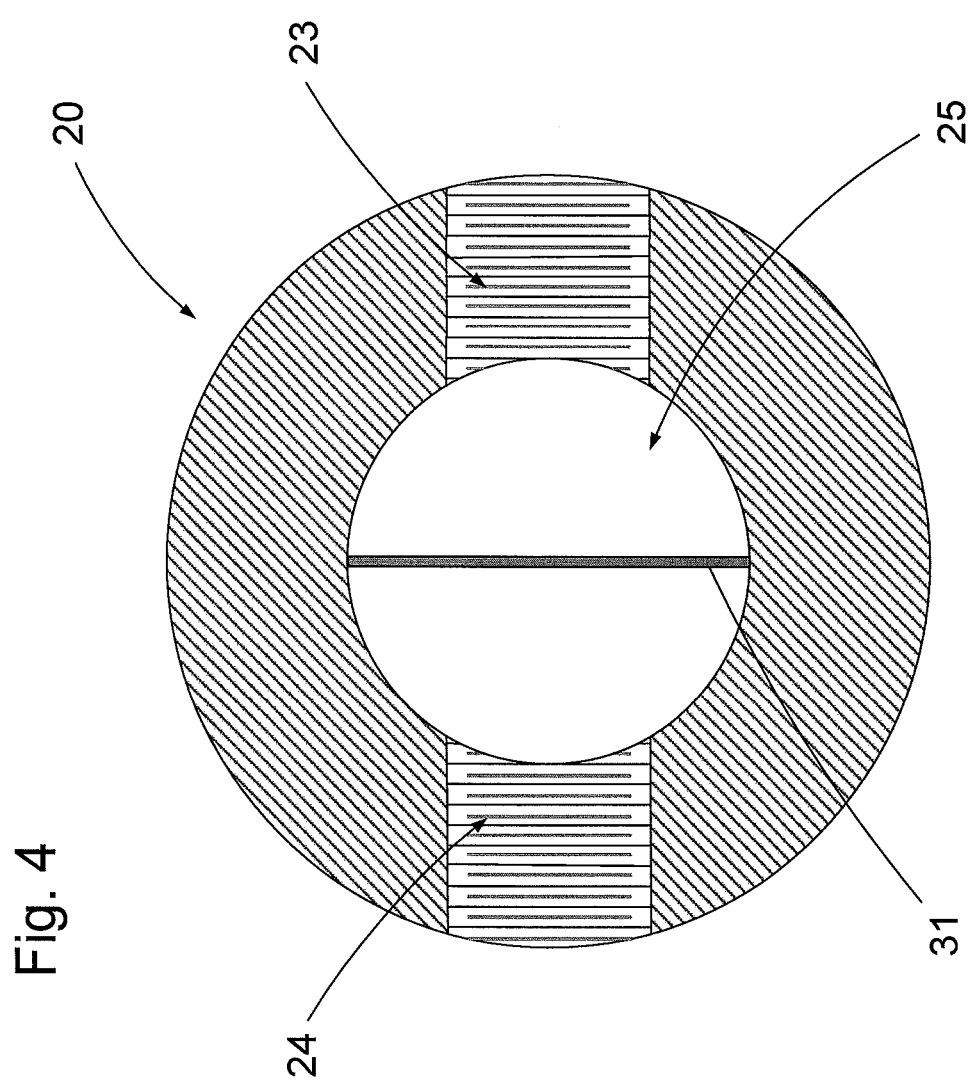
FIG. 4 is a cross-sectional end view of the exemplary embodiment shown in FIG. 1.

The heat-exchanging component 40 comprises a cylindrical conduit 41 provided with a plurality of uniformly spaced-apart heat-exchanging devices as exemplified in FIGS. 1-3 by fins 42 that radiate outwardly from the exterior surface of conduit 41, said plurality of fins 42 extending to a first end of the conduit 41. It is within the scope of this invention to provide a cylindrical conduit provided with a plurality of uniformly spaced-apart heat-exchanging devices, wherein one of the ends is preformed into a leak-proof sealed end (not shown). The plug 50 is configured to slidingly and sealingly engage the inner core of the first end of the conduit 40. A ferrule 55 is interposed the conduit 40 and the plug 50. If so desired, the plug 50 and the first end of conduit 40 may be configured to threadably cooperate. Alternatively, one end of the conduit 40 may be preformed into a leaf-proof sealed end prior to assembly of the apparatus of the present invention. The opposite end of the conduit 40 is provided with an integral locking nut 43 having a male-threaded collar portion 44 configured for threadably and sealably engaging the female-threaded coupling portion 26 of the manifold 20. A ferrule 55 is interposed the locking nut 43 and the conduit 40.

An exemplary helical turbulator insert 30 is configured to slidingly communicate with the inner core of the cylindrical conduit 41. A first end 31 of the turbulator insert 30 is configured into an elongate tang for slidingly engaging slot 27 provided at the end of bore 25 in the coupling manifold 20. The second end 32 of the turbulator insert 30 is elongate and abuts the plug 50. The second end 32 of the turbulator insert 30 is provided with a U-shaped opening.

The turbulated submersible heat-exchange apparatus 10 of the present invention is assembled by inserting the tang end 31 of the turbulator insert through bore 25 of the coupling manifold 20 into the slot 27. The heat-exchanging component is prepared for assembly by inserting plug 50 through ferrule 55 into the core of the first end of the cylindrical conduit 41 after which it is sealingly engaged to the conduit 41. Examples of suitable methods for sealingly engaging the plug 50 and ferrule 55 with the cylindrical conduit 41 include compression fittings, gluing with epoxy-type compounds, soldering, brazing and welding. Alternatively, the first end of the conduit 41 and the male end of the plug 50 may be threaded for threadable engagement. The opposite end of the heat-exchanging component 40 is then slid over the second end 32 of the turbulator insert 30 extending from the coupling manifold 20, after which the male-threaded coupling 44 of the heat-exchanging component 40 is engaged with the female-threaded coupling 26 of the coupling manifold 20, and then tightened by concurrently twisting together locking nut 43 and opposing flat surfaces 22 until a leak-proof seal is achieved. The assembled apparatus 10 may then be installed into a tank provided with a female-threaded receptacle for threadably and sealably engaging with coupling portion 21 of the coupling manifold 20. If so desired, selected hose barbs (not shown) may be sealably engaged with the inlet port 23 and the outlet port 24 of the coupling manifold prior to installation of the apparatus 10 into a tank wherein fluids with thermo-variable viscosities are to be stored. Alternatively, metal fluid transmission lines provided with compression nuts (not shown) may be sealably engaged with the inlet and outlet ports 23 and 24 of the coupling manifold 20 after the apparatus 10 has been sealably engaged with a tank selected for storage of industrial oil products such as fuel oils, hydraulic oils, crude and refined petroleum oil products, plant-derived oils, animal-derived oils, and other types of industrial fluids such as glycols, water-based hydraulic fluids, and oil-field brines. After installation, the inlet and outlet ports 23 and 24 of the apparatus 10 are preferably interconnected to a pressurizable supply of a temperature-controlled heat-exchange fluid, said supply comprising at least a fluid reservoir, a temperature-modifying and temperature-regulating component, a controllable device for pressurizing said temperature-controlled heat-exchange fluid, and fluid transmission lines interconnecting said supply and the apparatus 10 of the present invention. It is preferable that the pressurizable supply of a temperature-controlled heat-exchange fluid is also provided with at least one fluid transmission line that isolates the supply from the apparatus 10 whereby the heat-exchange fluid is cyclable only within the pressurizable supply.

The turbulated submersible heat-exchange apparatus 10 of the present invention is particularly useful for very quickly heating and thereby decreasing the viscosity of a cold-thickened oil product stored within a tank under cold weather conditions. In such situations, the heat-exchange fluid is isolated from the apparatus 10 and cycled within the pressurized supply system while it is heated to and maintained about a selected operating temperature, e.g., in the range of 85° C. to 99° C. It should be noted that the turbulated submersible heat-exchange apparatus is suitable for cooperating with steam as the heat-exchange medium circulating therethrough. The heated heat-exchange fluid is then controllably released under pressure into the transmission line (not shown) interconnecting the supply to the inlet port 23 of the coupling manifold 20 and enters bore 25 where its flow is redirected by the tang-shaped end 31 along the inlet-facing surface of the turbulator insert 30 toward the opposite end where it flows sideways through the U-shaped opening 32 and is redirected along the outlet-facing surface of the turbulator insert 30 to the tang-shaped end 31 where it is redirected to flow out of apparatus 10 through outlet port 24. It is to be noted that the engagement of the tang 31 of the turbulator with the slot 27 in the coupling manifold 20 prevents the turbulator 30 from spinning within the heat-exchanging component 40 thereby maintaining the bi-directional spiralling flow patterns of the pressurized heat-exchange fluid provided by the helical turbulator insert 30 within and along the length of the heat-exchange component 40 thereby facilitating the rapid and even transfer and dissipation of heat from the pressurized heat-exchange fluid within the heat-exchange component through the walls of the cylindrical conduit 41 and heat-exchange fins 42 into the surrounding thickened oils, while minimizing the occurrence of hot and cold spots.

Figure 5:
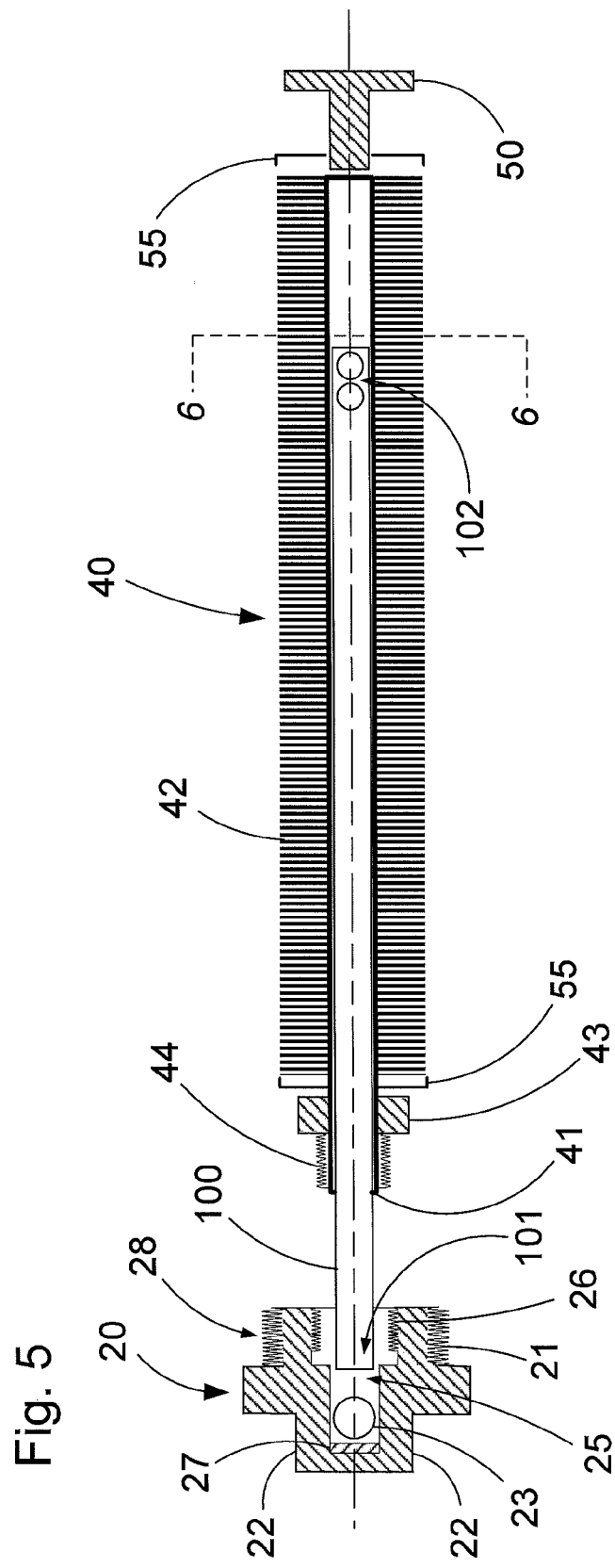
FIG. 5 is a partially exploded cross-sectional side view showing a turbulated immersion heat exchange apparatus according to the present invention provided with an alternative rectilinear flow separator.

FIGS. 5 and 6(a) show an alternative embodiment for providing a separated two-way flow of a pressurized heat-exchange fluid within and along the core of the heat-exchanging conduit 41, wherein a flat rectilinear flow separator 100 is provided with a tang end 101 configured to engage the transverse slot 27 provided at the end of the bore 25 in the body of the coupling manifold 20 while the opposite end 102 is provided with a U-shaped opening and configured to engage the end of the plug 50. In operation, heated heat-exchange fluid enters the turbulated immersion heat exchange apparatus through the inlet port 23 of the coupling manifold 20 and enters bore 25 where its flow is redirected by the tang-shaped end 31 along the inlet-facing surface of the flow separator insert 100 toward the opposite end where it flows sideways through a pair of bores 102 and is redirected along the outlet-facing surface of the flow separator insert 100 to the tang-shaped end 101 where it is redirected to flow out of apparatus 10 through outlet port 24. If so desired, a single bore or multiple bores may be provided for the sideway's flow of heat-exchange fluid through the flow separator inert 100. Alternatively, the bores 102 may be replaced with a U-shaped opening similar to the one shown in FIGS. 2 and 3. FIG. 6(b) shows another exemplary elongate flow separator 120 provided with opposing rolled elongate edges 120a configured to direct the flow of the heat-exchange fluid within the cylindrical conduit 41 away from the junctures of the flow separator 120 and the conduit 40 walls.

Figure 7:
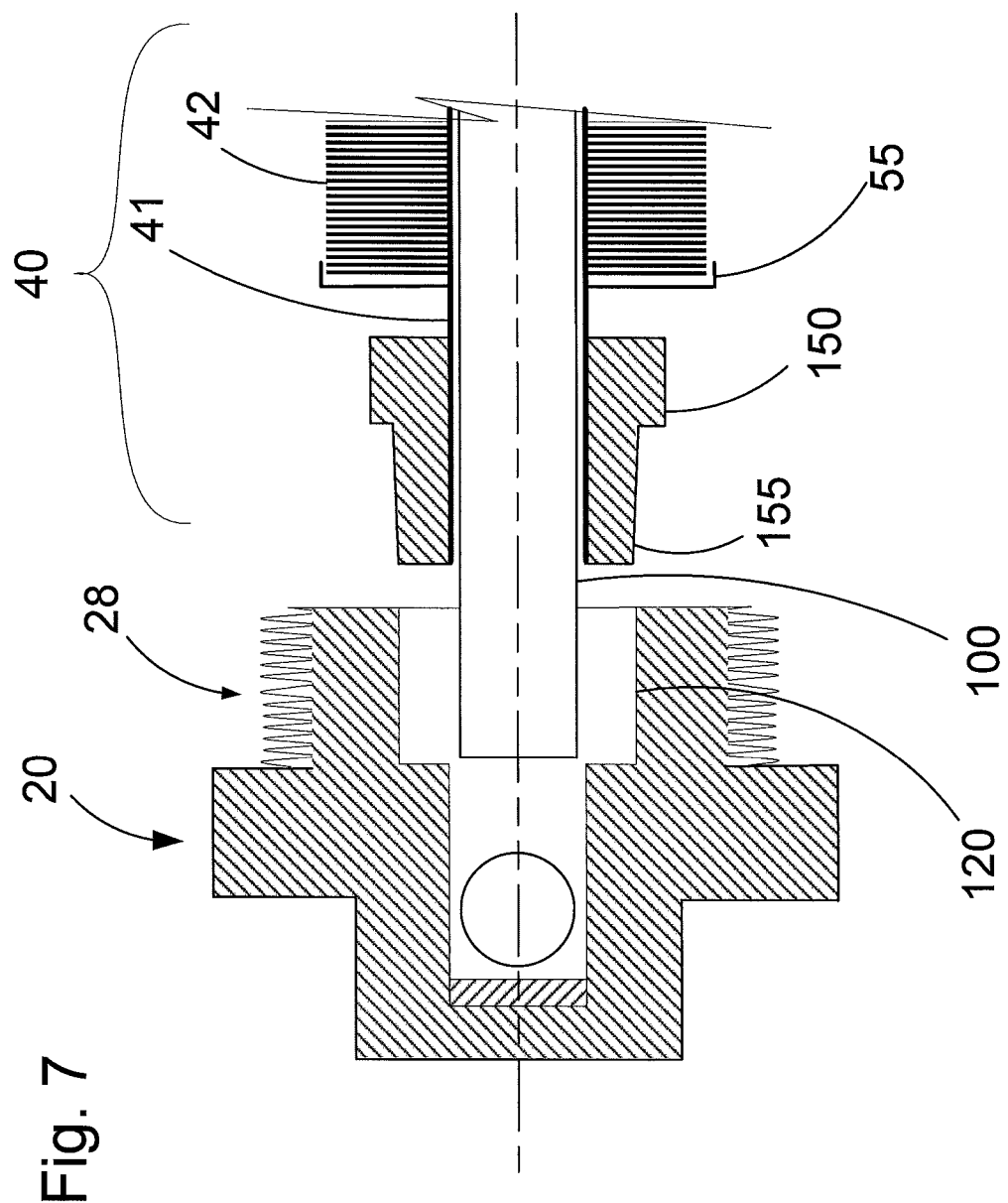
FIG. 7 is a close-up partially exploded cross-sectional side view showing an alternative configuration for sealably engaging the heat-exchanging component with the coupling manifold.

FIG. 7 shows another exemplary embodiment for sealingly engaging the heat-exchange component 40 with the coupler manifold 20, wherein the collar portion 28 of the coupler manifold 20 is provided with an inner bore 120 configured for sealably receiving and engaging there in a tapered neck portion 155 of a collar 150 integrally conjoined to the heat-exchange cylindrical conduit 41 of the heat-exchange component 40. The coupler 20 may be sealingly engaged with the collar 150 by application of pressure, or alternatively, by a polymeric adhesive or brazing or other like methods.

Figure 8:
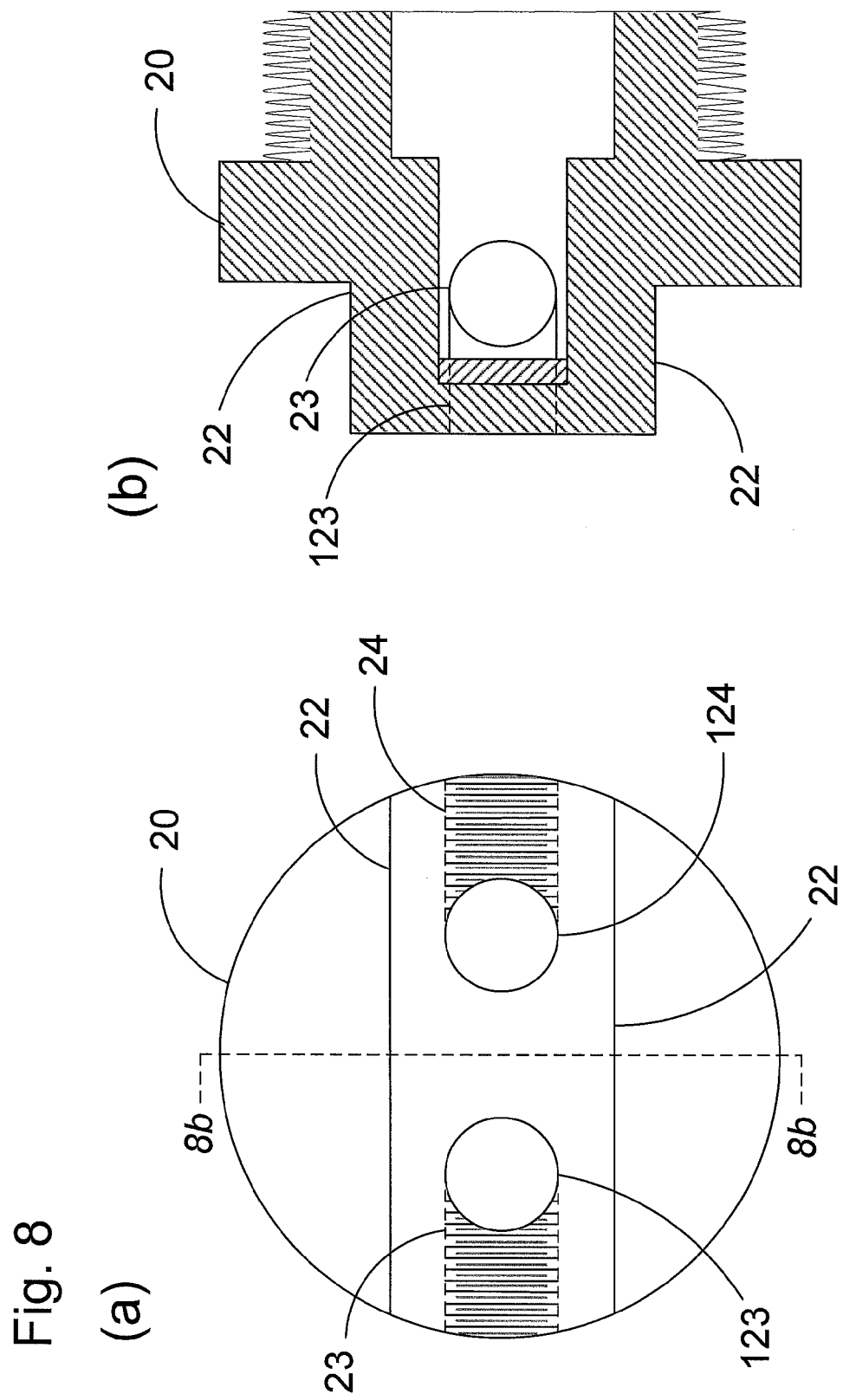
FIG. 8($a$) is an end view showing an alternative embodiment of the coupling manifold of the present invention, and 8(b) is a cross-sectional side view of the embodiment shown in FIG. 8($a$).

FIGS. 8(a) and 8(b) show another exemplary embodiment of the coupling manifold 20 provided with two opposing flat surfaces 22 configured to cooperate with the jaws of a wrenching tool (not shown) wherein: (a) an additional threaded inlet/outlet port 123 is provided at about a 90° angle to inlet/outlet port 23, and (b) an additional threaded inlet/outlet port 124 is provided at about a 90° angle to inlet/outlet port 24. This configuration provides options for sealingly engaging conventional hose barbs and/or fluid transmission lines with the sides of the coupling manifold 20 or alternatively with the end.

Those skilled in these arts will understand the individual components comprising the turbulated submersible heat-exchange apparatus 10 of the present invention may be configured and tailored specifically for installation and use in different sizes and shapes of fuel tanks, hydraulic oil tanks and reservoir storage tanks, e.g., by changing: (a) the diameters and dimensions of the inlet and outlet ports 23 and 24, the bore 25, and the male-threaded and female-threaded coupling portions 21 and 26 of the coupling manifold, (b) the length, diameter and wall-thickness of the cylindrical conduit 41, (d) the thickness, spacing and outer diameter of the heat-exchanging fins 42, and (d) the thickness and number of spirals provided along a given length of the helical turbulator insert 30. For installations into fuel tanks, it is preferable that the turbulated submersible heat-exchange apparatus 10 is mounted in a horizontal axis in parallel with and near the bottom of the fuel tank. Alternatively, the heat-exchange apparatus may be mounted through the bottom of the tank with the finned heat-exchanging component 40 extending upwardly in a vertical orientation. For installations in closed-system hydraulic oil tanks communicating with hydraulic cylinders configured to manipulate tasking attachments, the turbulated submersible heat-exchange apparatus 10 may be installed through the top of the tank with the finned heat-exchanging component 40 extending downwardly in a vertical orientation. Regardless of mounting orientation, the installed submersible heat-exchange apparatus may be interconnected with a heat-exchange fluid transmission line communicating with the cooling system provided for the equipment's engine.

Alternatively, the inlet port for receiving a heated heat-exchange fluid into the submersible heat-exchange apparatus may be configured for quick-release demountable engagement with transmission line communicating with a pressurized supply of heat-exchange fluid. Such a supply may be installed in and provided from a service building and may be configured to quick connect and disconnect with a plurality of mobile equipment provided with the submersible heat-exchange apparatus of the present invention. Alternatively, the supply may be mounted on and operable from a transportable equipment which may be driven to equipment provided with the submersible heat-exchange apparatus of the present invention.

The present invention is also suitable for installations in large reservoir tanks configured for storage of crude and refined petroleum products in refineries and depots, wherein the facilities' heating/cooling utilities can be configured to provide an in-house on-demand supply of pressurized temperature-controlled heat-exchange fluid for transmission to on-site storage tanks equipped with the turbulated submersible heat-change apparatus.

Another exemplary embodiment of the presenting invention provides for mounting within a single tank, a plurality of interconnected turbulated submersible heat-exchange apparatus of the present invention wherein the outlet port 23 of a first apparatus 10 is interconnected with the inlet port 23 of a second apparatus 10. It is also within the scope of the present invention to provide a multi-head coupling manifold (not shown) configured sealably engage and supply pressurized temperature-controlled heat-exchange fluid to a plurality of heat-exchanging components 40 wherein each component 40 communicates and cooperates with a dedicated bore 25, and is provided with a turbulator insert 30 having the tang end 31 engaged with a tang slot 27 provided at the end of the dedicated bore 25.

While this invention has been described with respect to the preferred embodiments, it is to be understood that various alterations and modifications can be made to components and the applications of the turbulated submersible heat-exchange apparatus within the scope of this invention, which are limited only by the scope of the appended claims.

What is claimed is:

1. A submersible heat-exchanging apparatus for sealably engaging a wall of a fluid storage tank, the apparatus comprising:
   a coupling manifold with a body and a first collar portion extending therefrom, said first collar portion provided with an outward facing male-threaded portion for sealably engaging a female-threaded aperture in the wall of the fluid storage tank, and wherein the first collar portion defines a first bore extending partially into the body, and wherein the body has a second bore therethrough, said second bore intersecting the first bore in a transverse plane and defining an inlet port and an opposing outlet port in communication with the first bore, said first bore terminating with a flat wall provided with a slot interposed between said inlet port and said outlet port;
   a heat-exchange component comprising a heat-conductive conduit having an outer wall, an inner wall, a first open end, and a second open end, wherein the second open end is provided with an integral locking nut and a male-threaded second collar portion for sealingly engaging with the coupling manifold, with a first ferrule adjacent to the locking nut, and wherein the first open end is provided with a second ferrule interposed between the first open end and a plug, and wherein the outer wall is provided with a plurality of uniformly spaced-apart heat-radiating fins extending outwardly from the outer wall, said heat-radiating fins extending along said conduit from the first ferrule to the second ferrule;
   a terminal plug device configured to sealably engage the first end of said heat-exchange component; and
   a flow-directing elongate helical insert configured to concurrently engage the terminal plug device sealingly engaged with the first end of said heat-exchange component and with the slot in the flat wall of the first bore in said coupling manifold, said elongate helical insert provided with at least one aperture at an end configured to engage the terminal plug device, said elongate helical insert further configured to slidingly contact and cooperate with the inner wall of the heat-conductive conduit thereby partitioning the heat-conductive conduit into two opposed fluid transmission channels wherein one channel communicates with the inlet port and the other channel communicates with the outlet port.

2. The apparatus of claim 1, wherein the outward facing male-threaded portion of the first collar portion of the coupling manifold is configured to sealingly engage a threaded aperture provided therefor in a receptacle configured for containing fluids.

3. The apparatus of claim 1, wherein the first open end of the heat-conductive conduit is configured into a leak-proof sealed end.

4. The apparatus of claim 1, wherein the at least one aperture provided at an end of the flow-directing elongate insert is a U-shaped opening extending thereto the end of said insert.

5. The apparatus of claim 1, wherein the flow-directing elongate insert is provided with arcuate elongate side edges, said side edges extending away from each other.

6. The apparatus of claim 1, wherein the second collar portion of the heat-exchange component is provided with male threads and a portion of the first bore of the first collar portion of the coupling manifold is provided with female threads configured for sealingly engaging said male threads of said second collar portion.

7. The apparatus of claim 1, wherein the second collar portion of the heat-exchange component is sealingly engaged with the inward-facing bore of the first collar portion of the coupling manifold by a process selected from the group consisting of compression, brazing, welding, and afixing with a polymeric adhesive.

8. The apparatus of claim 1, wherein said inlet port and said outlet port are configured to sealingly cooperate with heat-exchange fluid conveying conduits.

9. The apparatus of claim 1, wherein said coupling manifold is provided with a pair of inlet ports and a pair of outlet ports.

10. The apparatus of claim 9, wherein one of said pair of inlet ports extends to a sidewall of the coupling manifold and the other of said pair of inlet ports extends to the end wall of the coupling manifold.

11. The apparatus of claim 9, wherein one of said pair of outlet ports extends to a sidewall of the coupling manifold and the other of said pair of outlet ports extends to the end wall of the coupling manifold.

\* \* \* \* \*